United States Patent
Eschbach et al.

(10) Patent No.: US 7,382,919 B2
(45) Date of Patent: Jun. 3, 2008

(54) SYSTEM AND METHOD FOR EDITING IMAGE DATA

(75) Inventors: Reiner Eschbach, Webster, NY (US); Zhigang Fan, Webster, NY (US); William Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 217 days.

(21) Appl. No.: 11/472,698

(22) Filed: Jun. 22, 2006

(65) Prior Publication Data

US 2007/0297672 A1   Dec. 27, 2007

(51) Int. Cl.
*G06K 9/34* (2006.01)

(52) U.S. Cl. .................... 382/173; 382/164; 382/167; 382/176; 358/505

(58) Field of Classification Search ............... 382/173, 382/175, 176, 190, 164, 165; 358/453, 462, 358/505, 474, 487
See application file for complete search history.

(56) References Cited

U.S. PATENT DOCUMENTS

| | | | |
|---|---|---|---|
| 5,729,704 A * | 3/1998 | Stone et al. ................ | 715/804 |
| 5,990,901 A * | 11/1999 | Lawton et al. .............. | 345/581 |
| 6,298,151 B1 | 10/2001 | Jodoin et al. | |
| 6,373,981 B1 | 4/2002 | de Queiroz et al. | |
| 6,389,163 B1 | 5/2002 | Jodoin et al. | |
| 6,400,844 B1 | 6/2002 | Fan et al. | |
| 6,549,658 B1 | 4/2003 | Schweid et al. | |
| 6,594,401 B1 | 7/2003 | Metcalfe et al. | |
| 6,782,129 B1 | 8/2004 | Li et al. | |
| 6,832,007 B1 | 12/2004 | Zhang et al. | |
| 6,859,204 B2 | 2/2005 | Curry et al. | |
| 2004/0096122 A1 | 5/2004 | Curry et al. | |
| 2005/0111731 A1 | 5/2005 | Bai et al. | |

* cited by examiner

*Primary Examiner*—Matthew C. Bella
*Assistant Examiner*—Ali Bayat
(74) *Attorney, Agent, or Firm*—Fay Sharpe LLP

(57) ABSTRACT

A method for editing image data includes segmenting input image data into a plurality of discrete objects, wherein each of the objects is defined by a plurality of input pixels that are spatially grouped and that relate to a common content type and feature of the input image data so as to define an objectized input image from the input image data. The objectized input image and a holding area image are generated and simultaneously displayed. Editing input is received from a user by user selection of an object of the objectized input image that the user desires to be moved from the objectized input image to the holding area image based upon the user's visual inspection of the objectized input image. The objectized input image and the holding area image are updated based upon the received editing input so that the selected object is deleted from an original location in the objectized input image and inserted into the holding area image as a temporary object at an insertion location that spatially corresponds to the original location of the objectized input image. The method further includes receiving replacement input data from the user that indicates a selected replacement object in a replacement object database to be inserted into the original location of the objectized input image. The objectized input image is updated to include the selected replacement object in the original location to define an objectized output image.

20 Claims, 9 Drawing Sheets

SYSTEM AND METHOD FOR EDITING IMAGE DATA

BACKGROUND

In is often necessary to modify digital image data derived from one or more scanned documents or other sources, in order to generate a new digital image for storage, display, printing and/or further processing. Examples of such modifications include the need to substitute a new image such as a digital photograph or a computer-generated graphics object such as a graph, chart, etc. into the digital image data derived from the scanning operation in order to generate a new, updated digital image data file for display, printing, storage and/or other use. Such editing is sometimes referred as repurposing, because the original image data derived from the scanned document is updated and/or revised in order to serve a new purpose.

Known image processing systems have been found to be sub-optimal for editing image data derived from a scanned document. With known systems, it is technically possible to modify image data derived from a scanned document, but known systems have not allowed such modifications to be performed in an objectized fashion by simple point-and-click operations by unsophisticated users using a graphical user interface. For example, with commonly used image processing software, a user can manually define a group of pixels to be cut from an input image, using the cursor to pull a box around or otherwise encircle the group of pixels to be cut from the image. A group of replacement pixels can then be manually moved into the resulting void in the original image using a paste operation. This process is obviously time consuming and prone to errors and requires a relatively skilled user. Known image processing systems have not provided for segmentation and classification of the scanner-derived digital image data in combination with an intuitive graphical user interface that allows a user to manipulate the segmented objects of the scanner-derived image data relative to a database of available replacement objects and that allows the replacement object database to be updated to include objects from the scanner-derived data. In short, known systems are labor-intensive, time consuming and have not been found to be suitable or desirable for large jobs or other cases where high productivity is required, and where user training and knowledge might be limited.

A system and method for editing image data in accordance with the present development overcomes the deficiencies of known image processing systems and provides other enhancements and features that simplify and improve productivity for image editing operations.

SUMMARY

In accordance with a first aspect of the present development, a method for editing image data includes: deriving input image data that define an input image in terms of a plurality of input pixels; segmenting the input image data into a plurality of discrete objects, wherein each of the objects is defined by a plurality of input pixels that are spatially grouped and that relate to a common content type and feature of the input image data so as to define an objectized input image from the input image data; generating and simultaneously displaying the objectized input image and a holding area image; receiving editing input from a user by user selection of an object of the objectized input image that the user desires to be moved from the objectized input image to the holding area image based upon the user's visual inspection of the objectized input image; updating the objectized input image and the holding area image based upon the received editing input so that the selected object is deleted from an original location in the objectized input image and inserted into the holding area image as a temporary object at an insertion location that spatially corresponds to the original location of the objectized input image; receiving replacement input data from the user that indicates a selected replacement object in a replacement object database to be inserted into the original location of the objectized input image; updating the objectized input image to include the selected replacement object in the original location to define an objectized output image.

In accordance with another aspect of the present development, an apparatus for editing an image includes: means for deriving input image data in terms of a plurality of input pixels; an display for outputting image data to a user; an input device for selecting objects displayed as part of a graphical user interface on said display; an image processing unit comprising: (i) means for segmenting the input image data into a plurality of discrete objects, wherein each of the objects is defined by a plurality of input pixels that are spatially grouped and that relate to a common content type and feature of the input image data so as to define an objectized input image from the input image data; (ii) means for generating and simultaneously displaying the objectized input image and a holding area image on the display; (iii) means for receiving editing input from the input device controlled by a user for user selection of an object of the objectized input image that the user desires to be moved from the objectized input image to the holding area image based upon the user's visual inspection of the objectized input image; (iv) means for updating the objectized input image and the holding area image on the display based upon the received editing input so that the selected object is deleted from an original location in the objectized input image and inserted into the holding area image as a temporary object at an insertion location that spatially corresponds to the original location of the objectized input image; (iv) means for receiving replacement input data from said input device controlled by the user by which the user indicates a selected replacement object in a replacement object database to be inserted into the original location of the objectized input image; and, (v) means for updating the objectized input image on the display to include the selected replacement object in the original location to define an objectized output image.

BRIEF DESCRIPTION OF DRAWINGS

The development comprises various components and arrangements of components, and various steps and arrangements of steps, preferred embodiments of which are disclosed herein with reference to the accompanying drawings, wherein.

DETAILED DESCRIPTION

Figure 1:
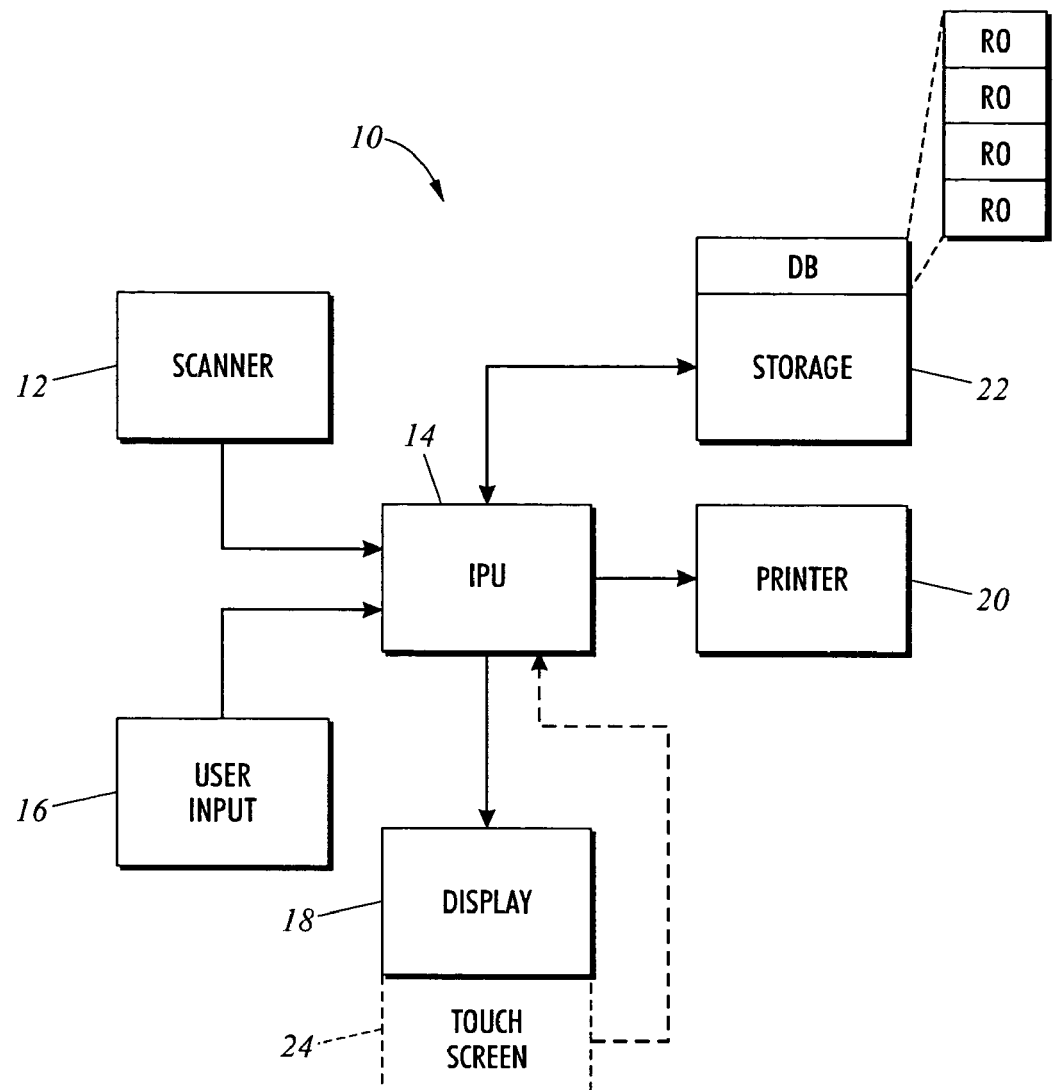
FIG. 1 illustrates a digital image processing system for implementation of a system and method for editing image data in accordance with the present development.

FIG. 1 illustrates a digital image processing apparatus 10 formed in accordance with the present development. The image processing apparatus 10 can be embodied in a personal/office computing system, an image processing system such as a scanning/copying system such as a digital copier or a multifunction (scan/print/fax/copy) digital image processing system or as a part of a PrePress system or the like. More particularly, the image processing system 10 includes a scanner 12 for receiving one or more printed document pages as input and deriving digital data that represent the printed document page as output. The system 10 further includes an image processing unit (IPU) 14 for performing digital image processing operations in accordance with the present development and others, i.e., for receiving input digital image data and for processing the data to derive edited, enhanced or otherwise altered digital image data as output in accordance with stored algorithms and/or based on user-selected functions and/or other user input. The system 10 further comprises one or more user input devices 16, e.g., a mouse, touch-pad or other pointing device, a keyboard, stylus, etc., that are operatively connected to the IPU 14 and that allow a user to input command data to the image processing unit 14 to control the image processing operations and all other functions of the system 10, typically using a graphical user interface. The system 10 further comprises one or more output devices that are operatively connected to the IPU including a visual display 18, a printer 20, and/or a mass storage device 22 such as a disk drive or the like. It should be noted that the visual display 18 can comprise a touch-screen input device 24 operatively connected to the IPIU for user input to the IPU by using a finger or a stylus or the like to select and/or manipulate an object displayed on the video screen of the visual display. Also, the storage device 22 can also provide input to the IPU.

In the most general terms, a page of a document having one or more printed pages is processed by the scanner 12 to derive digital image data that represent the printed page in terms of a plurality of pixels conceptually arranged in rows and columns. The digital image data are input from the scanner 12 to the IPU 14 and are output from the IPU, in original or processed form based upon stored image processing algorithms, image processing circuitry, and/or user input from the input device(s) 16,24, to one or more of the output devices such as the visual display 18 for viewing, the printer 20 for generation of a new printed document and/or the mass storage device 22 for saving the data. In one embodiment, the system 10 is provided by a personal computer system programmed to perform digital image processing operations. In another embodiment, the system 10 is a dedicated digital image processing system such as a XEROX DocuTech or DocuColor image printing/reproduction system or the like. The scanner 12 can be replaced by another device such as storage device, camera or the like that supplies input image data to the image processing unit.

As described in full detail below, as part of the present development, the storage device 22 of the system 10 preferably includes a replacement object database DB defined by one or more replacement objects. Each replacement object RO is a raster image file (e.g., a bytemap or the like) such as, without limitation, scanner-derived image data, computer generated image data, an image of text/notes, a computer-generated graphics image, photographic image data, etc, or a file that can simply be converted to a raster file like simple vector graphics, etc. In one embodiment, the IPU 14 is programmed to scan the storage device 22 or certain locations thereof or other locations periodically to locate any and all possible replacement objects RO and/or to generate new replacement objects RO from certain file types, and all located and/or newly generated replacement objects are input to the replacement object database DB. It is understood that not all components of the system in FIG. 1 have to be present at a single location or at a single instance of time. Also it is understood that they can be replaced by functional equivalents. For example, scanner 12 functionality might have been achieved at an earlier time at a remote location and the scanned image file might have been transmitted in any form to the system at any point in time after scanning. Also, scanning functionality can be achieved using a conventional scanner, but also by other means such as for example a digital camera or other input means.

Figure 2:
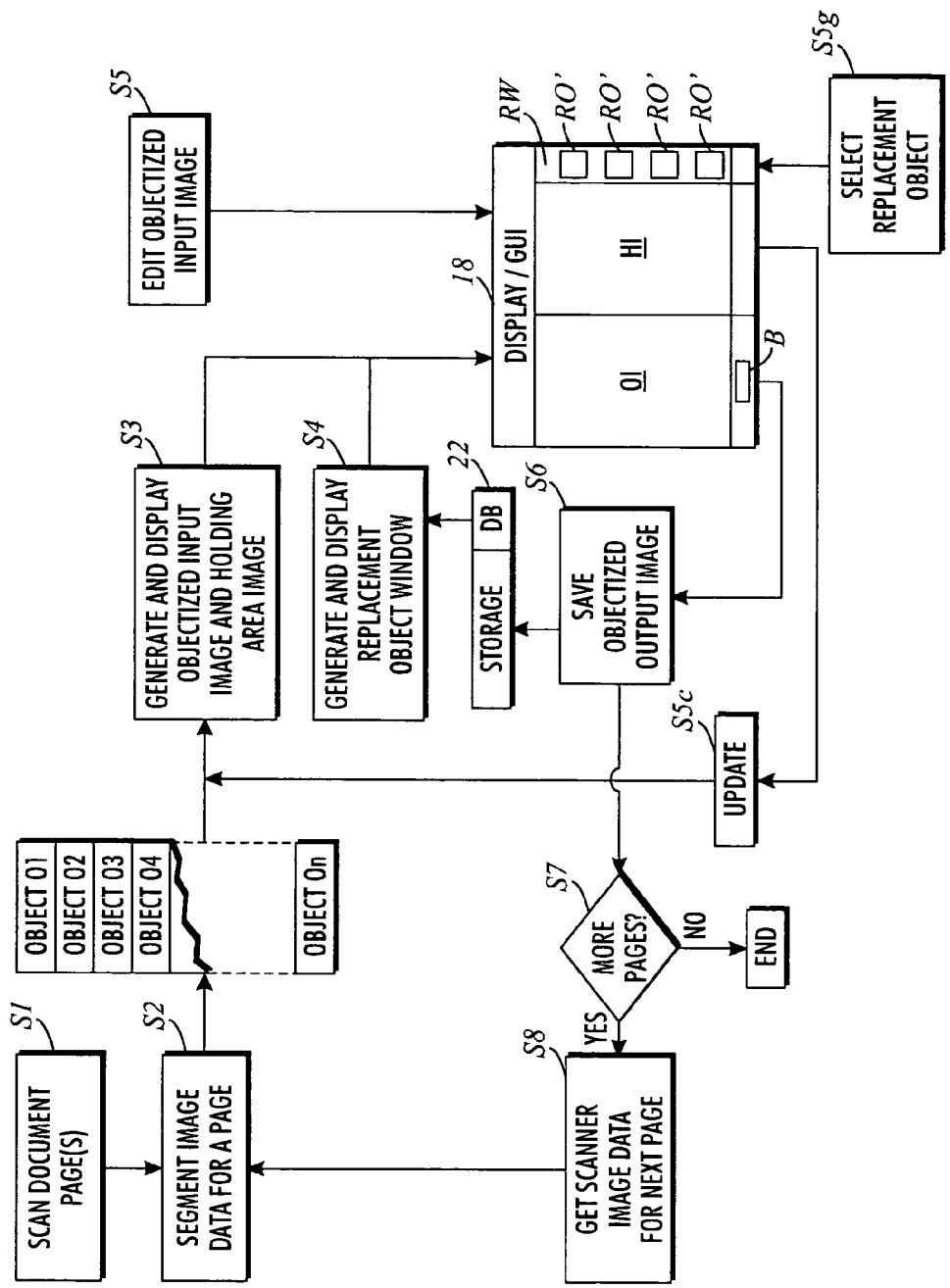
FIG. 2 is a diagrammatic illustration of a system and method for editing image data in accordance with the present development.

FIG. 2 is a diagrammatic illustration of a system and method for editing image data in accordance with the present development that can be implemented using the system 10 of FIG. 1. In a step S1, one or more printed pages of a document are scanned and the original digital image data defining each pixel are derived and input to the IPU 14 so that the IPU includes a digital image of each scanned printed document page, with each scanned printed page represented by a corresponding input image. In a step S2, carried out in the IPU, the input image data for a first document page are segmented into a plurality of discrete objects O1, O2, . . . , On, wherein spatially neighboring pixels (i.e., pixels in a defined group) having similar properties and that relate to common features of the input image data are grouped together into discrete image portions or segments or components referred to herein as "objects" O1, . . . , On such as text objects, graphics objects, photographic objects, line art objects, etc. This grouping can be augmented by additional classifications of each object O1, . . . , On along data versus noise, and/or image versus artifact, etc. Also it is understood that the grouping of neighboring pixels comprehends sub-objects and their spatial arrangement, as is common for graphics, text, etc. Also it is understood that the grouping is preferably performed along humanly understandable lines, but that other groupings are also possible. This automated segmentation operation can be implemented using any of a wide variety of segmentation and storage algorithms as are generally known in the art, e.g., using a mixed raster content (MRC) method, wherein digital image representations of composite documents, i.e., documents having pages with mixed content including text, graphics, photographs, line art, etc., are segmented into discrete objects based on content type, but maintained in the same overall file. Alternatively, the components, can be maintained in more than one data file, with a clear association between the individual files.

Examples of suitable methods for segmenting and classifying digital image are disclosed in the following commonly owned U.S. patents and published patent application documents, and the disclosures of these documents are hereby expressly incorporated by reference into this specification: U.S. Pat. No. 6,782,129 (Li et al.); U.S. Pat. No. 6,389,163 (Jodoin et al.); U.S. Pat. No. 6,298,151 (Jodoin et al.); U.S. Published Application No. 2005/0111731 (Bai et al.); U.S. Pat. No. 6,832,007 (Zhang et al.); U.S. Pat. No. 6,400,844 (Fan et al.); U.S. Pat. No. 6,859,204 (Curry et al.); U.S. Published Application No. 2004/0096122 (Curry et al.); U.S. Pat. No. 6,594,401 (Metcalfe et al.); U.S. Pat. No. 6,373,981 (de Queiroz et al.); U.S. Pat. No. 6,549,658 (Schweid et al.).

In a step S3, the IPU 14 generates two separate digital images for each scanned document page: (i) an objectized input image OI defined by and including the objects O1, . . . , On derived in step S2; and, (ii) a holding area image HI which is typically initialized as an empty (i.e., background only) image used for editing operations as described below. The objectized input image OI and the holding area image HI are directly related to each other, in the sense that the holding area image HI is the same size and shape as the objectized input image OI or at least bears a clear relationship to the objectized input image OI so that when one or more image objects O1, . . . , On are moved from one image OI,HI to the other image OI,HI as described in full detail below, the objects O1, . . . , On are displayed in the exact same relative spatial location in either image OI,HI for ease of visual reference by a user. Also in the step S3, the IPU displays both of these images OI,HI to a user on the display 18, preferably simultaneously side-by-side so that a user can simultaneously view and compare the two images.

It is preferred that, in a step S4, the IPU generates a replacement object window RW and drives the display 18 to output the replacement object database window to a user. The replacement object window RW includes a listing and/or a reduced size/resolution (thumbnail) and/or a full-resolution version of each replacement object RO in the replacement object database, and a user can use the input devices 16,24 to scroll through and select any of the replacement objects for reasons that will become apparent below. It is preferred that as part of the step S4, the IPU displays the replacement object window RW on the display 18 simultaneously with the objectized input image OI and holding area image HI, although the user is preferably given the option to close or minimize the replacement object window as desired.

In a step S5, the user performs an editing operation to command the IPU 14 to replace one or more objects O1, . . . , On of the objectized input image OI with a replacement object RO from the replacement object database DB as described in further detail below. This results in the creation of an objectized output image O0, which is a edited version of the objectized input image OI. Specifically, the user views the displayed objectized input image OI and holding area image HI for the scanned document page on the display 18, preferably simultaneously side-by-side, and uses the user input device(s) 16,24 such as a mouse, stylus, touch screen to move one or more objects O1, . . . , On from the objectized input image OI to the holding area image HI (or in the opposite direction from the holding area image HI to the objectized input image OI). Preferably, the user uses the mouse, touch screen, stylus, or the like 16,24 to "click-on" or select the object O1, . . . , On to be moved, at which time the object is moved automatically from the original input image OI to a corresponding position in the holding area image HI or vice versa, wherein the data defining the pixels of the moved object O1, . . . , On take the place of the data defining the pixels in the receiving/destination image. It is important to note that any image object O1, . . . , On is identified and transferred with a single "click" or similar selection operation by the user, and that the user is not required to draw a line around a group of pixels or otherwise manually define a region of pixels to be cut and moved, because the objects O1, . . . , On have already been automatically defined as described above in connection with segmentation step S2. Also, it should be evident to those of ordinary skill in the art that image objects O1, . . . , On often are separated from each other by background or "white" space. In cases where the segmentation operation S2 indicates such a spatial separation between different objects, the object selection mechanism is preferably extended to include pixels near to the object, thus making selection on a coarse screen, e.g. touch screen, more easily achieved so that selecting any pixel of or near an object O1, . . . , On is sufficient to select the object. Alternatively, the user can manipulate the input devices 16,24 to select and drag the selected object O1, . . . , On from one image OI,HI to the other image, and the dragged object will be automatically arranged by the IPU in a position in the destination image that corresponds to the position from which it was dragged in the other image, once the object is dragged onto any part of the destination image. Any object O1, . . . , On selected and dragged within one of the images OI,HI will be returned by the IPU to its original location in that image if the user attempts to drop the object at a new location within an image, i.e., it is not possible to move an object O1, . . . , On within an image OI,HI in the normal operational mode. It is understood, however, that standard image editing methods can be optionally connected to the described system wherein these standard image editing methods are accessed via special commands/key sequences. The simultaneous display of the objected input image OI and the holding area image HI and preferably also the replacement object window RW defines a graphical user interface (GUI) in accordance with the present development. The GUI as presented visually on the display device 18 further comprises a selectable NEXT/DONE button B that is selected by the user input devices 16,24 in order to move processing forward to the next step if no editing operations are desired/required for a particular displayed objectized input image OI or when all editing operations for a particular objectized input image OI are completed.

Figure 3:
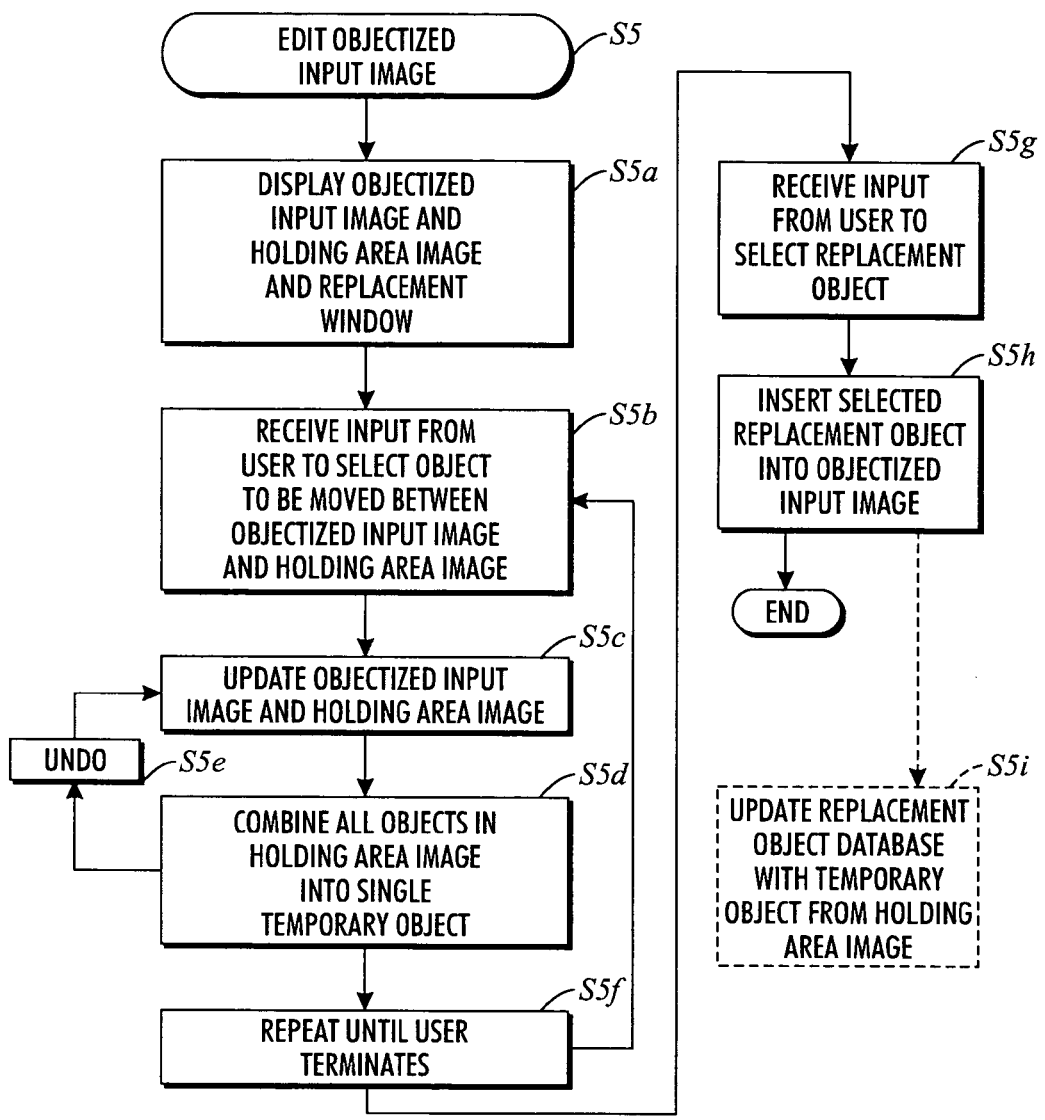
FIG. 3 is a flow chart that discloses a method for editing image data in accordance with the present development.

This editing operation S5 is disclosed further with reference to FIG. 3. In a step S5a the objectized input image OI and holding area image HI and replacement object window RW are displayed (preferably simultaneously) on the display 18 for viewing by the user. In a step S5b, the user provides input to the IPU 14 as to any object or objects O1, . . . , On to be moved from the objectized input image to the holding area image HI (or in the opposite direction to undo previous object moves). This user input is preferably provided by way of the graphical user interface GUI. In a step S5c, the objectized input image OI and the holding area image HI are updated by the IPU 14 in accordance with the user input, and the updated images OI,HI are output to the display 18 for viewing by the user in real time. In particular, the object O1, . . . , On selected by the user is deleted from the objectized input image and inserted at a corresponding location in to the holding area image HI (or vice versa). In a step S5d, when the selected object O1, . . . , On is moved to the holding area image HI, the IPU created a new higher level object definition that includes the moved object and any other object(s) already included in the holding area image HI, and this higher level object definition is referred to herein as a "temporary object." As shown by an optional undo step S5e, a temporary object and/or any constituent object thereof can be "deselected," i.e., moved from the holding area image HI back to its respective original position in the objectized input image OI using one of the input devices 16,24 to select and move the temporary object as a whole or to select and move a constituent object part of the temporary object, which results in the IPU automatically deleting the deselected object or the entire temporary object from the holding area image HI and inserting the same back into the objectized input image OI; In one example, the reversal step operates in a sequential fashion, whereby each previous object move from the objectize input image OI to the holding area image HI is undone in succession when a user clicks or otherwise uses an input device to select the temporary object (or an "undo" button is provided for selection by the user as part of the graphical user interface GUI), starting with the object O1, . . . , On most recently moved from the objectized input image OI to the holding area image HI. It should also be noted that individual objects and or a temporary object defined by multiple objects can be deleted from the holding area image HI, by selecting and deleting same or by other suitable delete means (e.g., dragging same to a trash or recycle icon on the desktop of the display 18), without inserting any replacement object RO into the objectized input image to replace the deleted object.

As indicated at step S5f, the object selection operation S5b is repeated zero or more times as desired by the user until a desired temporary object (defined by one or more moved objects O1, . . . , On) is defined in the holding area image HI.

In a step S5g the user provides input to the IPU 14 to select a replacement object RO from the replacement object database DB to be inserted into the objectized input image OI in place of the temporary object defined in the holding area image HI. In particular, the user operates one of the input devices 16,24 to select a replacement object RO from the replacement object database DB using the replacement object window RW art of the user interface GUI.

In a step S5h, the IPU 14 inserts the data defining the replacement object RO selected in step S5g into the objectized input image OI at the location defined by the object(s) O1, . . . , On deleted from the objectized input image OI, so as to define an new objectized image, referred to herein as the objectized output image O0. As part of the insertion operation S5h, the IPU assigns to the replacement object RO the attributes (e.g., size, location, color, etc.) of the temporary object to be replaced by the replacement object RO, without the need for any additional user input, so that the selected replacement object RO fits precisely into the empty area of the objectized input image OI defined where one or more objects O1, . . . , On were deleted from the objectized input image OI by user editing as described above, and so that the selected replacement object RO otherwise properly fills the empty area of the objectized input image OI, e.g., in terms of color vs. black-and-white or other attributes. It can thus be said that the replacement object RO inherits the attributes of the temporary object defined by the one or more object(s) O1, . . . , On deleted from the objectized input image OI. Those of ordinary skill in the art will recognize that, in the case where a temporary object is defined in the holding area image HI using objects O1, . . . , On selected from spatially distant or otherwise unrelated regions of the objectize input image OI, the insertion operation S5h could result in a condition where the selected replacement object RO does not fit precisely into the corresponding empty original regions of the objectized input image. In such case, the IPU 14 will attempt to fit the selected replacement object RO into the required space by scaling, stretching, repeating, centering, bordering or otherwise altering the selected replacement object RO. As noted, the insertion of one or more replacement objects RO into the objectized input image OI defines an edited version of the objectized input image, which is referred to herein as an objectized output image OO.

Returning again to FIG. 2, after the user selects the NEXT/DONE button B of the user interface GUI with an input device 16,24, the editing operation S5 for that page of image data is complete, and processing moves to a save step S6 in which the IPU 14 saves the data defining the objectized output image OO to the storage device 22 (i.e., the edited objectized input image) for later processing, display, printing, etc. as desired.

In a step S7, the IPU 14 determines if an additional page of input image data is available for processing. If not, the editing process ends for the particular scanned document. If the step S7 determines that one or more additional pages of input image data remain for possible editing, the step S8 fetches the image data for the next remaining page and processing returns to step S2, to segment the image data to define the next objectized input image.

Figure 4:
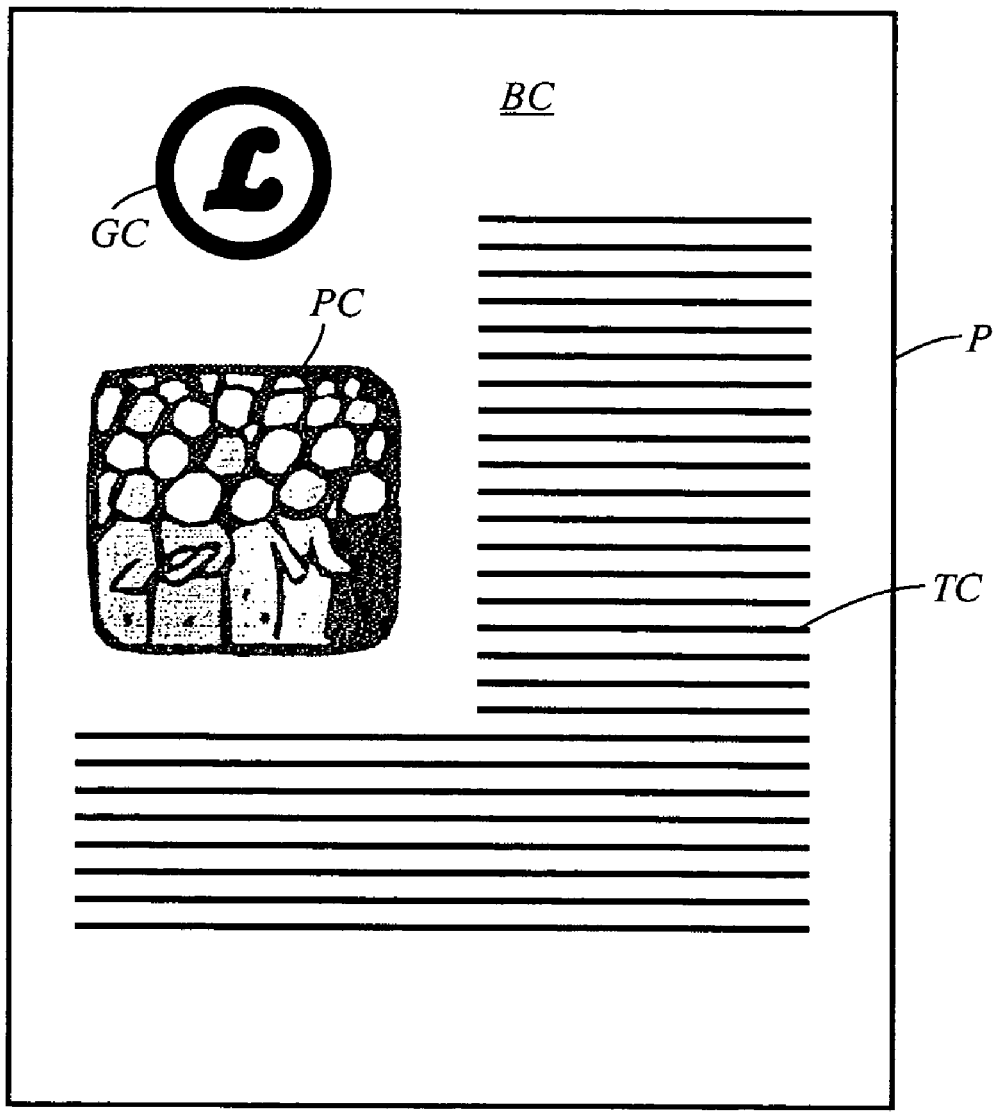
FIG. 4 is a diagrammatic illustration of a printed page of a document to be processed in accordance with the present development.

An example of the above editing process in accordance with the present development is described with reference to FIGS. 4-9. FIG. 4 illustrates a printed page P of a document to be edited. The printed document page P includes a textual component TC, a photographic image component PC and a computer-generated graphics component GC, all printed on a background component BC.

Figure 5:
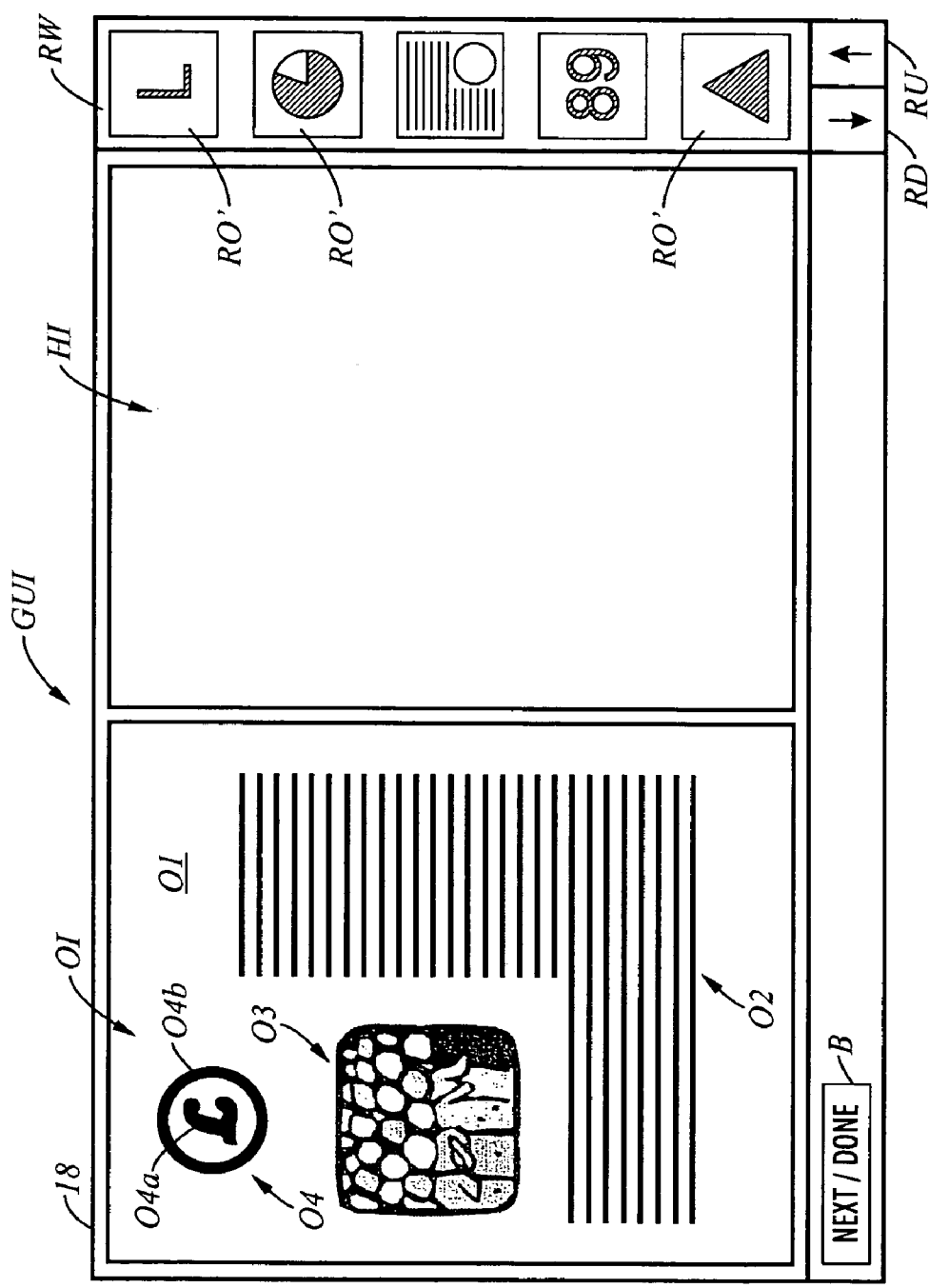
FIG. 5 is a diagrammatic illustration a graphical user interface (GUI) display in accordance with the present development and specifically related to the printed document page shown in FIG. 4.

When the document is scanned by the scanner 12, the IPU 14 drives the display 18 as shown in FIG. 5 to display the GUI comprising the objectized input image OI, the holding area image Hi, the replacement object window RW, and the NEXT/DONE button B. As segmented by the IPU 14 in the segmentation operation S2, the objectized input image OI comprises four objects: (i) a background object O1; (ii) a text object O2 (iii) a photographic image object O3; and, (iv) a computer-generated graphics objects O4. It should be noted that other segmentation operations S2 would likely result in the definition of more or less objects, e.g., the graphics object O4 could alternatively be segmented as two objects O4a,O4b but this does not alter the present development in any way, as long as the object to be edited is defined as a whole or at least all of the sub-components of the object to be edited are defined so that the whole object can be reconstructed as a temporary object in the holding area image HI as described herein. Also, it does not matter if the segmentation includes classification errors, i.e., the photographic image object O3 could be erroneously classified by the segmentation operation S2 as a computer-generated graphics object without adversely impacting the editing process of the present development.

With continuing reference to FIG. 5, the holding area image HI is initially empty as shown. The replacement object window RW is preferably displayed as part of the user interface GUI and includes a list of reduced size, i.e., thumbnail, version or other representation RO' of each replacement object RO in the replacement object database DB. The replacement object window RW includes arrows RD,RU or the like that can be selected by the user with input devices 16,24 to scroll the contents of the replacement object window RW so that a user see all representations RO' respectively corresponding to all replacement objects RO in the database DB.

Figure 6:
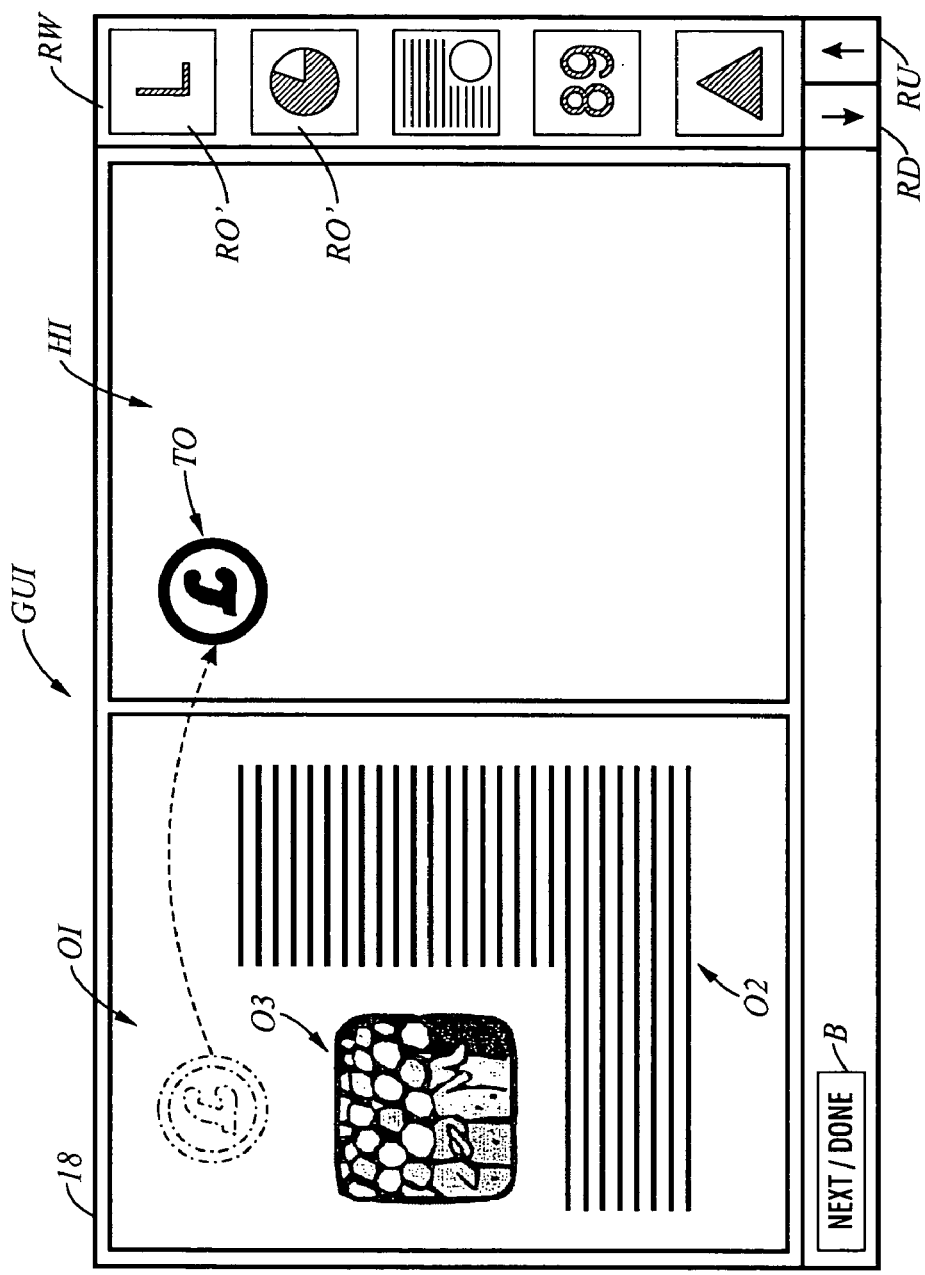
FIG. 6 shows the GUI of FIG. 5 in a revised state after receiving editing input in accordance with the method disclosed in FIG. 3.

FIG. 6 is identical to FIG. 5, but shows that editing operations S5 have been performed to move the object O4 (or both constituent objects O4a,O4b if segmented in that fashion by step S2) from the objectized input image OI to the holding area image HI, so that the object O4 is deleted from the objectized input image OI (as indicated with phantom lines) and becomes a temporary object TO in the holding area image HI.

Figure 7:
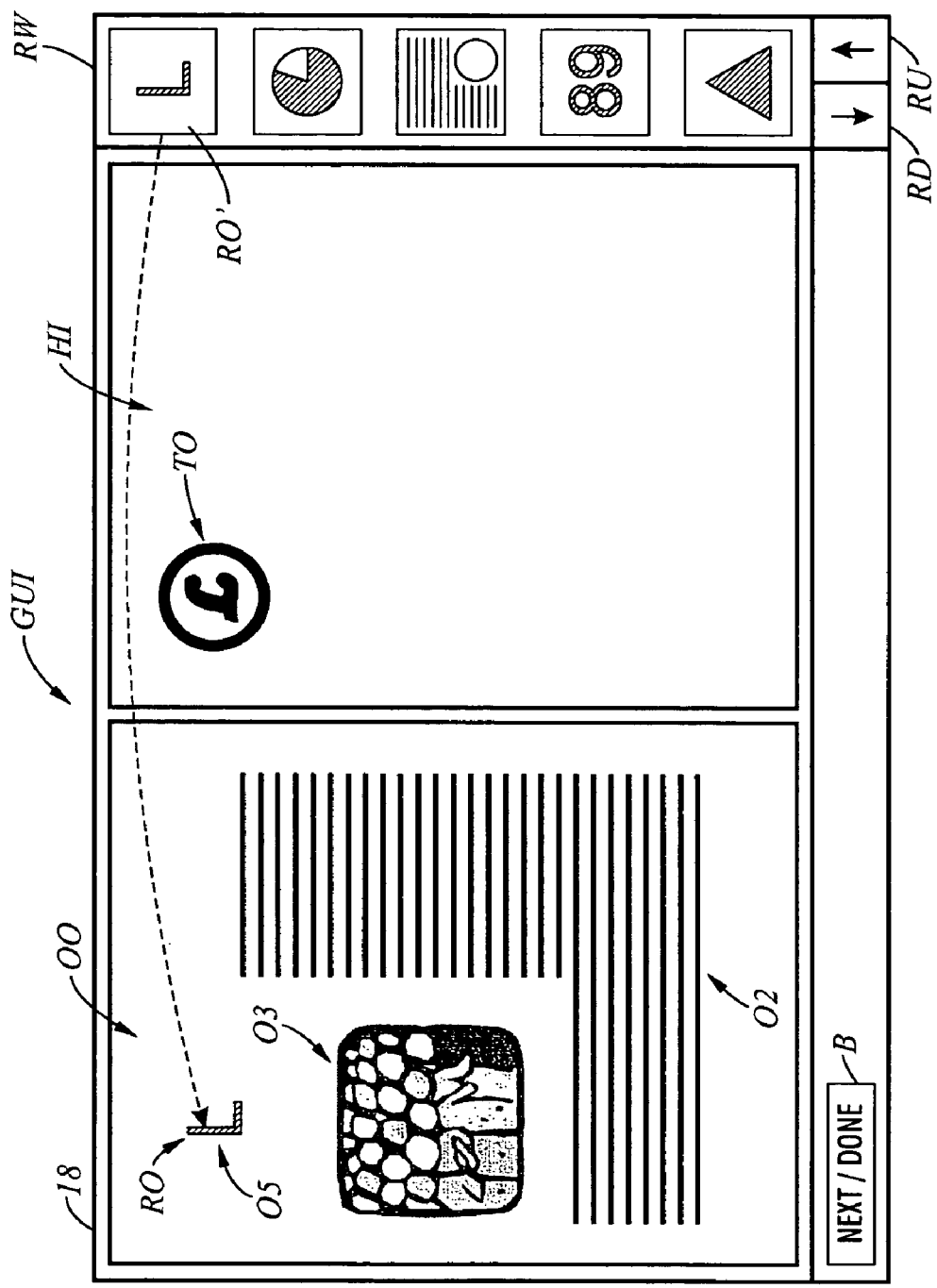
FIGS. 7 and 8 show the GUI of FIG. 6 further updated to reflect input received from a user; and, FIG. 9 shows an objectized output image (i.e., the edited objectized input image) that corresponds to the printed document page of FIG. 4 after processing in accordance with the present development.

FIG. 7 is an updated version of FIG. 6, where the user has moved forward with the editing process S5 to select a replacement object representation RO' from the replacement object window RW for insertion into the objectized input image to define an objectized output image O0. The new objectized output image O0 includes the objects O1,O2,O3 and the replacement object now indicated at O5, which has been scaled in terms of size by the IPU 14 to exactly fill the void left in the objectized input image OI by the earlier deletion of the object O4. Size, location, color and all other required attributes for replacement object RO' were derived directly from object TO in the holding area HI without the need for any additional user input.

Figure 8:
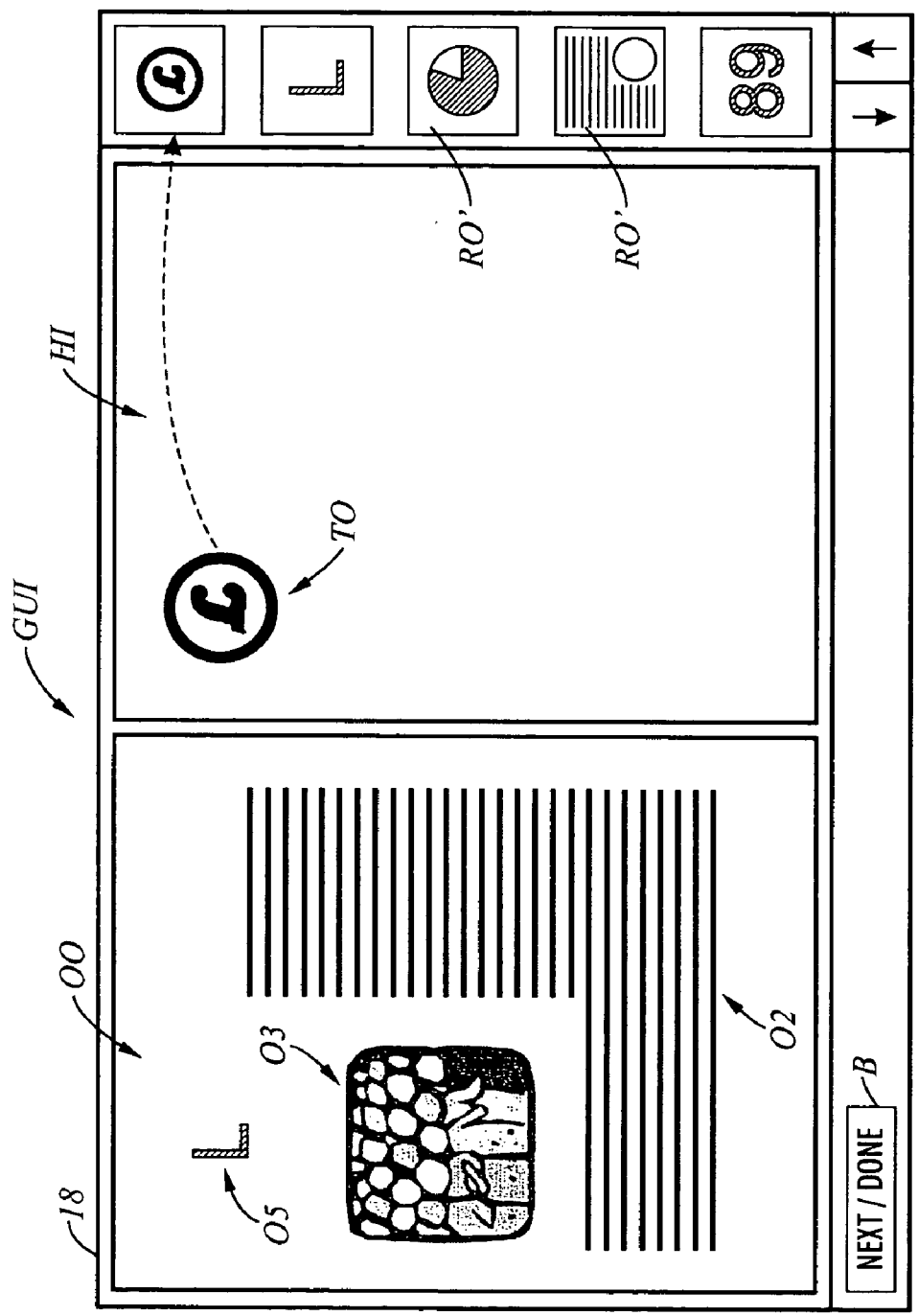

FIG. 8 is identical to FIG. 7, except that it illustrates the optional step S51 of updating the replacement object database DB with the temporary object TO from the holding area image HI. Using one or more of the input devices 16,24, the temporary object TO is selected for inclusion in the replacement object database DB by the IPU 14. Alternatively, the temporary object TO might be added to the replacement object database RW automatically if a replacement object has been inserted into the image OO. In another example, the temporary object TO is selected and dragged onto the replacement object window RW for saving it to the replacement object database DB. Alternatively, a special selection sequence (e.g., holding the shift key of a keyboard while clicking on the temporary object) is used to instruct the IPU 14 to add the temporary object TO from the holding area image HI to the database DB. In either case, the replacement object window RW is updated with a corresponding thumbnail image or other representation RO' of the newly added replacement object RO to reflect the fact that the temporary object TO has been added to the replacement object database DB. It should be noted that adding replacement object RO' to output image OO does not remove the replacement object from the replacement object database.

Figure 9:
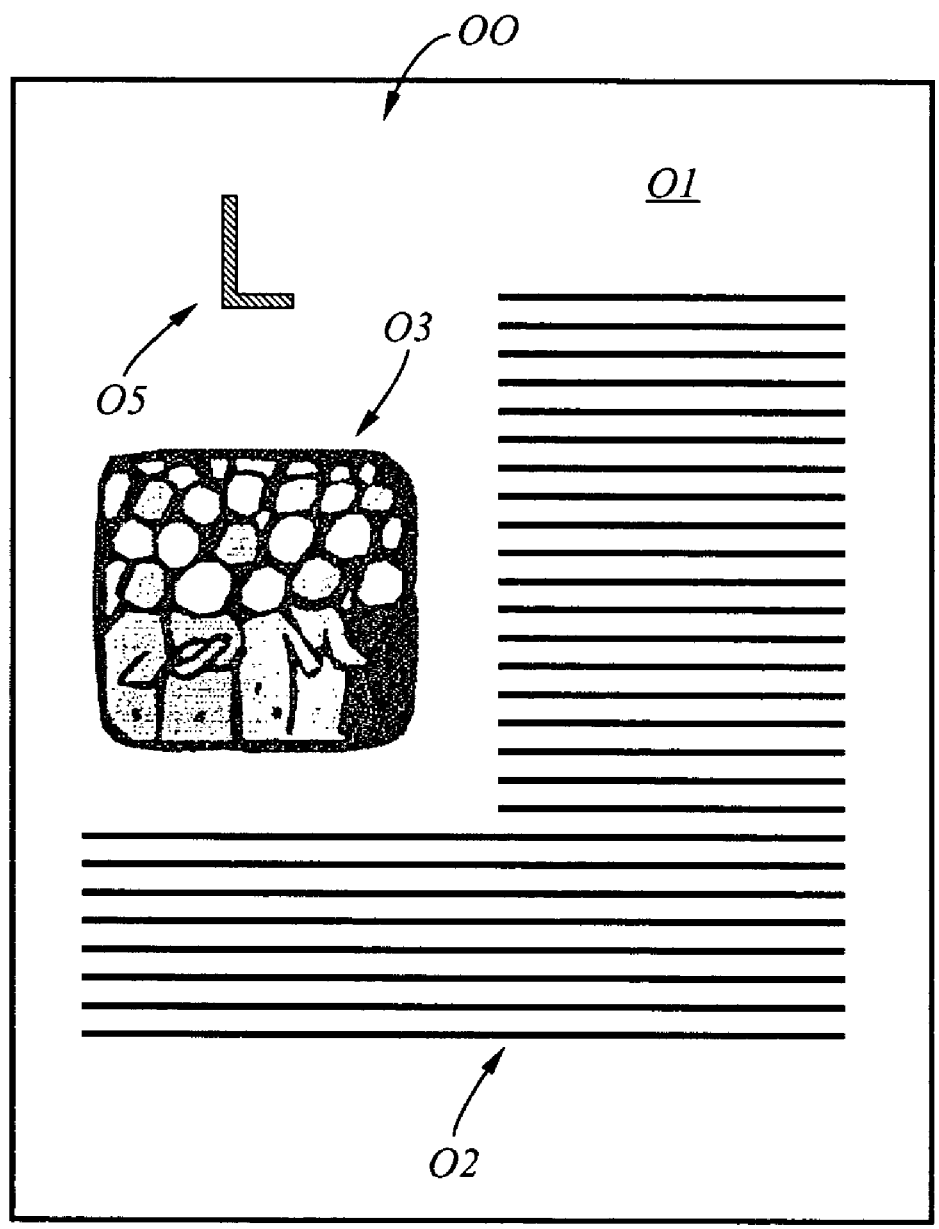

The user then selects the NEXT/DONE button B to save the objectized output image OO, a representation of which is shown in FIG. 9. It can be seen that the objectized output image is an updated version of the objectized input image OI, including a new logo or other object O5 in place of the original object O4. The objectized output image OO is then saved, printed, displayed or otherwise processed by the IPU according to user input, a stored program and/or other instructions.

The present development is related to and can be combined with the image editing system disclosed in co-pending U.S. patent application Ser. No. 11/170,013 filed Jun. 29, 2005 and entitled "Artifact Removal and Quality Assurance System and Method for Scanned Images," and the disclosure of application Ser. No. 11/170,013 is hereby expressly incorporated by reference into the present specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for editing image data, said method comprising:
deriving input image data that define an input image in terms of a plurality of input pixels;
segmenting the input image data into a plurality of discrete objects, wherein each of said objects is defined by a plurality of input pixels that are spatially grouped and that relate to a common content type and feature of the input image data so as to define an objectized input image from the input image data;
generating and simultaneously displaying the objectized input image and a holding area image;
receiving editing input from a user by user selection of an object of the objectized input image that the user desires to be moved from the objectized input image to the holding area image based upon the user's visual inspection of the objectized input image;
updating the objectized input image and the holding area image based upon the received editing input so that the selected object is deleted from an original location in the objectized input image and inserted into the holding area image as a temporary object at an insertion location that spatially corresponds to the original location of the objectized input image;
receiving replacement input data from the user that indicates a selected replacement object in a replacement object database to be inserted into the original location of the objectized input image;
updating the objectized input image to include the selected replacement object in the original location to define an objectized output image.

2. The method as set forth in claim 1, further comprising:
generating and displaying a replacement object window, said replacement object window including a representation of one or more replacement objects stored in said replacement object database;
wherein said step of receiving replacement input data from the user comprises receiving a user selection of the replacement object representations displayed in said replacement object window.

3. The method as set forth in claim 2, wherein the objectized input image, the holding area image, and the replacement object window are displayed simultaneously.

4. The method as set forth in claim 2, wherein each replacement object stored in said replacement object database contains or is convertible to raster image data.

5. The method as set forth in claim 2, further comprising:
scanning a storage location to identify image files stored in said storage location;
generating raster image data replacement objects from each of said stored image files; and,
storing said generated raster image data replacement objects in said replacement object database.

6. The method as set forth in claim 5, wherein each replacement object representation displayed in said replacement object window comprises at least one of: (i) a file name corresponding to a replacement object; or (ii) a reduced size image representation of a corresponding replacement object.

7. The method as set forth in claim 3, further comprising:
receiving input from said user to either: (i) store said temporary object as a replacement object in said replacement object database; or, (ii) delete said temporary object from said holding area image.

8. The method as set forth in claim 7, further comprising:
updating said replacement object window to include a replacement object representation that corresponds to said temporary object stored in said replacement object database.

9. The method as set forth in claim 1, wherein said step of updating the objectized input image to include the selected replacement object comprises:
assigning image attributes of the temporary object to the selected replacement object.

10. The method as set forth in claim 9, wherein said attributes comprise at least one of location, size and color.

11. The method as set forth in claim 1, wherein:
said step of receiving editing input from a user comprises user selection of multiple objects of the objectized input image that the user desires to be moved from the objectized input image to the holding area image;
said step of updating the objectized input image and the holding area image based upon the received editing input comprises updating the objectized input image and holding area image after selection of each object by the user; and,
said temporary object inserted into said holding area image is defined as a single higher-order object defined by all of said multiple objects selected by said user to be moved from the objectized input image to the holding area image.

12. The method as set forth in claim 11, further comprising:
receiving undo input from a user;
in response to said undo input, reversing a most recent occurrence of editing input received from said user and reversing a most recent update of said objectized input image and said holding area image.

13. The method as set forth in claim 1, wherein:
said objectized input image and a holding area image are presented to said user as a graphical user interface, and
said editing input and said replacement input are received from said user via said graphical user interface by an input device operated by said user.

14. The method as set forth in claim 13, wherein said input device comprises at least one of a pointing device or a touch screen.

15. The method as set forth in claim 14, wherein said editing input and said replacement input comprises a single point and click operation by which said user selects said object of said objectized input image and selects said replacement object by selecting any one pixel of said object or said replacement object.

16. The method as set forth in claim 1, wherein said holding area image is initialized as a blank image, including only background pixel data.

17. The method as set forth in claim 16, wherein said objectized input image is defined a mixed raster content (MRC) data.

18. The method as set forth in claim 1, wherein said step of deriving input image data comprises scanning a printed document page.

19. An apparatus for editing an image, said apparatus comprising:
means for deriving input image data in terms of a plurality of input pixels;
an display for outputting image data to a user;
an input device for selecting objects displayed as part of a graphical user interface on said display;
an image processing unit comprising: (i) means for segmenting the input image data into a plurality of discrete objects, wherein each of said objects is defined by a plurality of input pixels that are spatially grouped and that relate to a common content type and feature of the input image data so as to define an objectized input image from the input image data; (ii) means for generating and simultaneously displaying the objectized input image and a holding area image on the display; (iii) means for receiving editing input from said input device controlled by a user for user selection of an object of the objectized input image that the user desires to be moved from the objectized input image to the holding area image based upon the user's visual inspection of the objectized input image; (iv) means for updating the objectized input image and the holding area image on the display based upon the received editing input so that the selected object is deleted from an original location in the objectized input image and inserted into the holding area image as a temporary object at an insertion location that spatially corresponds to the original location of the objectized input image; (iv) means for receiving replacement input data from said input device controlled by the user by which the user indicates a selected replacement object in a replacement object database to be inserted into the original location of the objectized input image; and, (v) means for updating the objectized input image on the display to include the selected replacement object in the original location to define an objectized output image.

20. The apparatus as set forth in claim 19, wherein said means for deriving input image data comprises a document scanner.

* * * * *